(12) United States Patent
Deal et al.

(10) Patent No.: US 8,072,992 B2
(45) Date of Patent: Dec. 6, 2011

(54) INTERFACING REAL AND VIRTUAL NETWORKS IN HARDWARE-IN-THE-LOOP (HITL) SIMULATIONS

(75) Inventors: John C. Deal, Reston, VA (US); Ralph Martinez, Ashburn, VA (US); Todd Haynes, Herndon, VA (US); Walter G. Whimpenny, Ashburn, VA (US); Thai N. Nguyen, Springfield, VA (US); Scott A. Burgan, Ashburn, VA (US); Kevin McNeill, Alexandria, VA (US); Alim Needham, Alexandria, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 317 days.

(21) Appl. No.: 11/919,297

(22) PCT Filed: Aug. 29, 2006

(86) PCT No.: PCT/US2006/033648
§ 371 (c)(1),
(2), (4) Date: Oct. 26, 2009

(87) PCT Pub. No.: WO2007/027658
PCT Pub. Date: Mar. 8, 2007

(65) Prior Publication Data
US 2011/0142057 A1 Jun. 16, 2011

Related U.S. Application Data

(60) Provisional application No. 60/712,492, filed on Aug. 30, 2005.

(51) Int. Cl.
*H04L 12/56* (2006.01)

(52) U.S. Cl. .................................. 370/401; 370/466

(58) Field of Classification Search .............. 370/254, 370/395.5–395.52, 400–401, 463–466; 703/16–17, 703/20–22; 709/223–224
See application file for complete search history.

(56) References Cited

U.S. PATENT DOCUMENTS 7,047,176 B2 * 5/2006 Klevans et al. ............... 703/21
(Continued)

OTHER PUBLICATIONS

Martinez, et al., "Methodology For Incorporating Commercial Off The Shelf (COTS) Network Hardware Into OPNET Modeler For "Hardware in the Loop" Modeling & Simulation", Openworks, Aug. 2002, pp. 1-7, Computer Engineering Research Laboratory, Electrical & Computer Engineering Dept., The University of Arizona, Tucson, AZ 85721.

(Continued)

*Primary Examiner* — Frank Duong
(74) *Attorney, Agent, or Firm* — Daniel J. Long; Leo Zucker

(57) ABSTRACT

Real and simulated (virtual) networks are interfaced with one another for carrying out hardware-in-the-loop (HITL) testing and evaluations. A simulated network is modeled at a workstation by running a network simulation or discrete event modeling tool on the workstation. A virtual gateway node is defined in the simulated network, and the gateway node is linked with a network adapter on the workstation. An external real network operating with Internet protocol (IP) is also linked with the adapter. The adapter and the gateway node are configured to (i) translate simulated data packets sent from nodes of the simulated network and designated for the real network, into IP data packets for routing or processing by the real network, and (ii) translate IP data packets sent from nodes of the real network and designated for the simulated network, into simulated data packets for muting or processing by the simulated network.

18 Claims, 12 Drawing Sheets

U.S. PATENT DOCUMENTS

| | | | |
|---|---|---|---|
| 7,606,165 B2 * | 10/2009 | Qiu et al. | 370/252 |
| 7,620,535 B2 * | 11/2009 | Shevenell et al. | 703/13 |
| 2003/0036871 A1 | 2/2003 | Fuller, III et al. | |
| 2006/0015285 A1 | 1/2006 | Fuller, III et al. | |
| 2006/0064291 A1 | 3/2006 | Pattipatti et al. | |

OTHER PUBLICATIONS

Martinez, et al., "Hardware And Software-In-The-Loop Techniques Using The OPNET Modeling Tool For JTRS Developmental Testing", Military Communications Conference, 2003. MILCOM 2003, IEEE, Publication Date: Oct. 13-16, 2003, vol. 1, pp. 469- 474 vol. 1.

McNeill, et al.,"HITL/SITL General Reference Model", OPNETWORKS, Aug. 2003, Computer Engineering Research Laboratory, Electrical & Computer Engineering Dept., The University of Arizona, Tucson, AZ 85721.

* cited by examiner

| Attribute Name | Description | Type |
|---|---|---|
| Destination Ethernet MAC Address | The Ethernet MAC address corresponding to the hardware address of the network adapter on the workstation hosting this simulation and that will correspond to this esys interface. This address is necessary in order to package the constructed IP datagram within a properly formatted Ethernet frame over the corresponding Ethernet link connected to the IP router.<br><br>Ethernet hardware addresses are 48 bits, expressed as 12 hexadecimal digits (0-9, plus A-F, capitalized). Should be written hyphenated by octets (e.g., 12:34:56:78:9A:BC) | string |
| Source Ethernet MAC Address | The Ethernet MAC address corresponding to the hardware address of the network adapter of the router that will be directly connected to the workstation hosting this simulation. This address is necessary in order to package the constructed IP datagram within a properly formatted Ethernet frame over the corresponding Ethernet link connected to the IP router.<br><br>Ethernet hardware addresses are 48 bits, expressed as 12 hexadecimal digits (0-9, plus A-F, capitalized). Should be written hyphenated by octets (e.g., 12:34:56:78:9A:BC) | string |

FIG. 3

Event Definition Table

| Event Name | Event Description | Interrupt Type |
|---|---|---|
| Simulated IP Packet Arrival | Simulated IP packet arriving from connected OPNET workstation or router model's serial (PPP) interface | Stream |
| Real IP Packet Arrival | Real IP packet arriving from external system responsible for retrieving packets from network adapter and passing it to the OPNET simulation via the esys interface. | Esys |

FIG. 5

State-Level Decomposition Table

| State Name | State Description |
|---|---|
| Idle | Wait for interrupts corresponding to the above events |

FIG. 6

Event Response Table

| Current State | Logical Event | Condition | Action | Next State |
|---|---|---|---|---|
| Idle | Simulated IP Packet Arrival | | • Translate IP packet into a real IP packet<br>• Pass to external system via esys interface so it can be sent out on corresponding network adapter | Idle |
| | Real IP Packet Arrival | | • Translate IP packet into an OPNET IP packet<br>• Send out to connected node | Idle |

FIG. 7

INTERFACING REAL AND VIRTUAL NETWORKS IN HARDWARE-IN-THE-LOOP (HITL) SIMULATIONS

REFERENCE TO RELATED APPLICATION

This application claims priority of U.S. Provisional Patent Application No. 60/012,492 filed Aug. 30, 2005, and entitled "A Method of Interfacing Between Real IP Networks and Virtual Networks through Hardware in the Loop".

BACKGROUND OF THE INVENTION

1. Field of the Invention

The present invention relates to network data processing, and particularly to a method of interfacing data packets between real and virtual networks when carrying out hardware in the loop simulations.

2. Discussion of the Known Art

During development of communication (e.g., radio) and other networking hardware devices, only a limited number of actual prototypes are ordinarily available for testing. Because of this, it is difficult to test the prototypes exhaustively to confirm that a large number of the devices can communicate effectively with one another under various conditions over a real network. Therefore, an alternative approach toward testing has been adopted that involves modeling of the hardware specifications, and simulating the modeled specifications within a virtual network under a variety of conditions using a commercially available discrete event modeling tool such as, for example, OPNET Modeler® available from OPNET Technologies, Inc. (hereafter "OPNET").

A number of disparities may exist between the actual (real) hardware and its modeled specifications, however. Such disparities can have a significant impact on resources and production costs if not detected early on. Accordingly, there is a need for a bridge or technique to correlate real network devices (i.e., actual hardware) with their virtual models so as to reduce or eliminate disparities, and to improve the validation process for the devices.

Work has been performed toward interfacing real network hardware with an OPNET simulation for the purpose of evaluating individual network components as well as entire networks. See R. Martínez, et al., "Modeling & Simulation of Hardware-in-the-Loop Using OPNET Process Models", OPNETWorks Symposium, Washington, D.C. (August 2002); K. M. McNeil, et al., "HITL/SITL Generic Reference Model", OPNETWorks Symposium, Washington, D.C. (August 2003); and R. Martínez, et al., "Hardware and Software-in-the-Loop Techniques Using the OPNET Modeling Tool for JTRS Developmental Testing", MILCOM 2003 (October 2003). All relevant portions of the three mentioned articles are incorporated by reference.

The prior work uses the of sockets for extraction and insertion of data packets between simulated networks. That is, a TCP socket connection is used to send traffic, thus requiring a one-to-one mapping between two simulations. For example, simulated network A must create a specific TCP socket to simulated network B before sending data to network B. If network A wants to send data to simulated network C, then network A must create a new socket connection specifically for network C. Moreover, the known technique supports the exchange of packets only between simulated networks.

SUMMARY OF INVENTION

The present invention concerns a method of providing an interface that enables information or data packets to be exchanged between simulated networks and real networks operating under, e.g., an Internet Protocol (IP). The method allows network devices such as radios, workstations and routers that form parts of real networks, to connect to simulated network environments in such a manner that data packets can be exchanged and routed through both types of networks under various conditions.

According to the invention, real and virtual networks are interfaced with one another to carry out hardware-in-the-loop (HITL) simulations, by modeling a simulated network at a workstation by running a network simulation program on one or more processors of the workstation, providing a first network adapter at the workstation, and defining a virtual gateway node in the simulated network. The virtual gateway node is linked with the network adapter, and an external network is also linked with the adapter. The network adapter and the virtual gateway node are configured for (i) translating simulated packets sent from nodes of the simulated network and designated for the external network, into Internet protocol (IP) packets for routing or processing by the external network, and (ii) translating IP packets sent from nodes of the external network and designated for the simulated network, into simulated packets for routing or processing by the simulated network.

The inventive method solves the above-mentioned needs and may fulfill others with respect to the development of network protocols and waveforms. The method allows comprehensive comparison studies between a real hardware device and its simulated model, as well as scalability studies and analyses when only a few prototypes of the real device are available for testing.

For a better understanding of the invention, reference is made to the following description taken in conjunction with the accompanying drawing and the appended claims.

BRIEF DESCRIPTION OF THE DRAWING

In the drawing:

FIG. 3 is a table showing attributes of the virtual gateway node;

FIGS. 5-7 are tables describing operations carried out by the virtual gateway node;

DETAILED DESCRIPTION OF THE INVENTION

The inventive method provides an interface between real networks such as networks operating with Internet protocol (IP), and virtual network simulations such as, for example, networks modeled using a discrete event modeling tool such as OPNET. That is, the invention concerns a process and apparatus for providing an interface for exchanging information or data packets between real and virtual networks in real time. In the disclosed embodiment, the interface is constructed by leveraging existing co-simulation features of the known and commercially available OPNET modeling tool. Two important objectives are:

(1) Real IP traffic is carried across a simulated network in such a manner that observable effects on the traffic (e.g., delays, jitter, and hop count) are representative of those effects as they would be encountered if the simulated network were real. This permits the simulated network to be interposed as a bearer network between actual nodes of real networks, and to provide a credible representation of a real network; and (2) When simulated traffic enters a real network node, the traffic is converted so as to have all the measurable characteristics of real network traffic (e.g., headers including source and destination addresses, message size, QOS fields, etc.) and be routed across the real network by common IP devices, and yet be capable of conversion back into a fully viable simulation packet to enter another simulated network.

Basically, the inventive method is implemented as follows:

1. Only IP and higher layer packets are translated when exchanged between a simulated and a real network. Layer 2 protocols (e.g., Ethernet) are not.

2. A serial point-to-point protocol (PPP) interface is defined between a network (e.g., Ethernet) adapter on the workstation that runs the simulation, and an interface of an external edge network device (e.g., an external workstation, router or radio). The Ethernet frame is used only as a transport mechanism for each IP datagram that is handled between the external network and the simulation.

3. In the absence of dynamic routing protocols, static routes may be configured in order to route traffic between the real and the simulated network properly.

4. The simulation may be configured to run at real (_wallclock_) time, subject to the complexity of the network being modeled by the simulation and the performance of the computer running the simulation, all of which may cause the simulation to run slower.

5. Traffic originating in a simulated network is routed to terminate in a simulated network, and traffic originating in a real network is routed to terminate in a real network.

Figure 1:
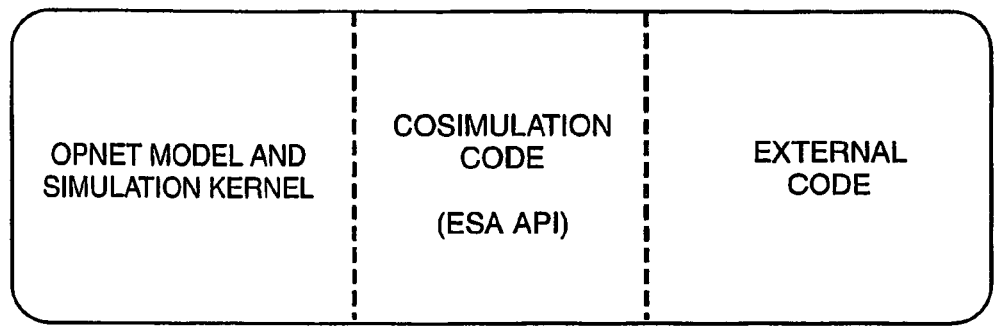
FIG. 1 is a representation of a co-simulation in a discrete event modeling tool.

As mentioned, the present method can be implemented using OPNET_s co-simulation framework. In FIG. 1, an OPNET co-simulation includes an OPNET model which contains one or more external system (esys) modules, a co-simulation code, and the external system code. Within a simulation, the esys module is a specialized processor module that also has the ability to receive interrupts from, and to exchange information with, external sources outside the simulation. The esys modules may contain one or more esys interfaces that allow data to be passed between an OPNET model running a simulation and an external system, via the co-simulation code.

The co-simulation code is written in a separate library and is responsible for passing information between the OPNET model and the external system via a set of OPNET external APIs that also allow the user to pause the simulation, to query the simulation for the current time, or to control the execution of the simulation. The external system may be another simulator, or a program that is attempting to communicate with an OPNET simulation.

The inventive method includes defining a separate node in a simulation program such as OPNET, which node is referred to herein as a "virtual gateway node". The virtual gateway node may be created without any change to existing OPNET standard models. A connection between the virtual gateway node and a serial point-to-point protocol (PPP) interface on the external device, are the only basic requirements.

The virtual gateway node can be defined in OPNET by leveraging the tool_s co-simulation API. The generic co-simulation API is capable of integrating or _gluing_together its own (OPNET) simulation environment with either a non-OPNET software program (e.g., MATLAB) or another OPNET simulation environment such that executions from both the OPNET simulation and the other software program are interleaved together. The co-simulation is then comprised of three modules, namely, the OPNET external system (esys) interface model(s), the co-simulation code, and the external code (e.g., MATLAB). The virtual gateway node is therefore constructed using the generic co-simulation API in such a manner as to interface a simulation with a physical device in a real IP network.

Figure 2:
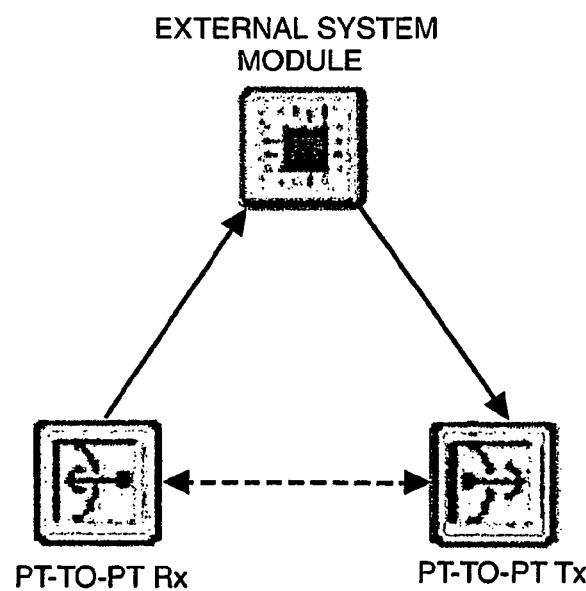
FIG. 2 is a model of a virtual gateway node according to the invention.

The external system module for the virtual gateway node contains an esys process model that is responsible for handling interrupts, calling the appropriate functions that are required for translating packets between real IP packets and the simulated OPNET packets, and providing the actual interface for the passing of packet pointers to and from the external system module. Translations are necessary between the real and the simulated packets because the format of simulated packets exchanged between virtual network nodes in OPNET, differs from that of real IP packets as generated in real IP networks. Hence, the corresponding translations are need so that the contents of an original real IP packet are maintained when the packet is passed through the virtual environment, and the corresponding packet retains all the measurable characteristics of the original IP packet as needed for routing by IP devices in a real IP network. FIG. 2 shows a model for the virtual gateway node.

Important functions of the virtual gateway node include:

1. Mapping the PPP serial interface on the external device to a network (Ethernet) adapter provided on the workstation running the simulation;

2. Converting simulated packets generated by the workstation running the simulation into real IP packets, and inserting the real IP packets into an Ethernet frame for transmission from a network adapter provided on the workstation running the simulation; and 3. Converting real IP packets to be passed into the simulation from the esys interface, into simulated (OPNET) packets.

A virtual gateway node according to the invention has attributes shown in the table of FIG. 3. The attributes serve to address Ethernet frames that encapsulate the IP packets used to communicate with the external IP network or device.

Figure 4:
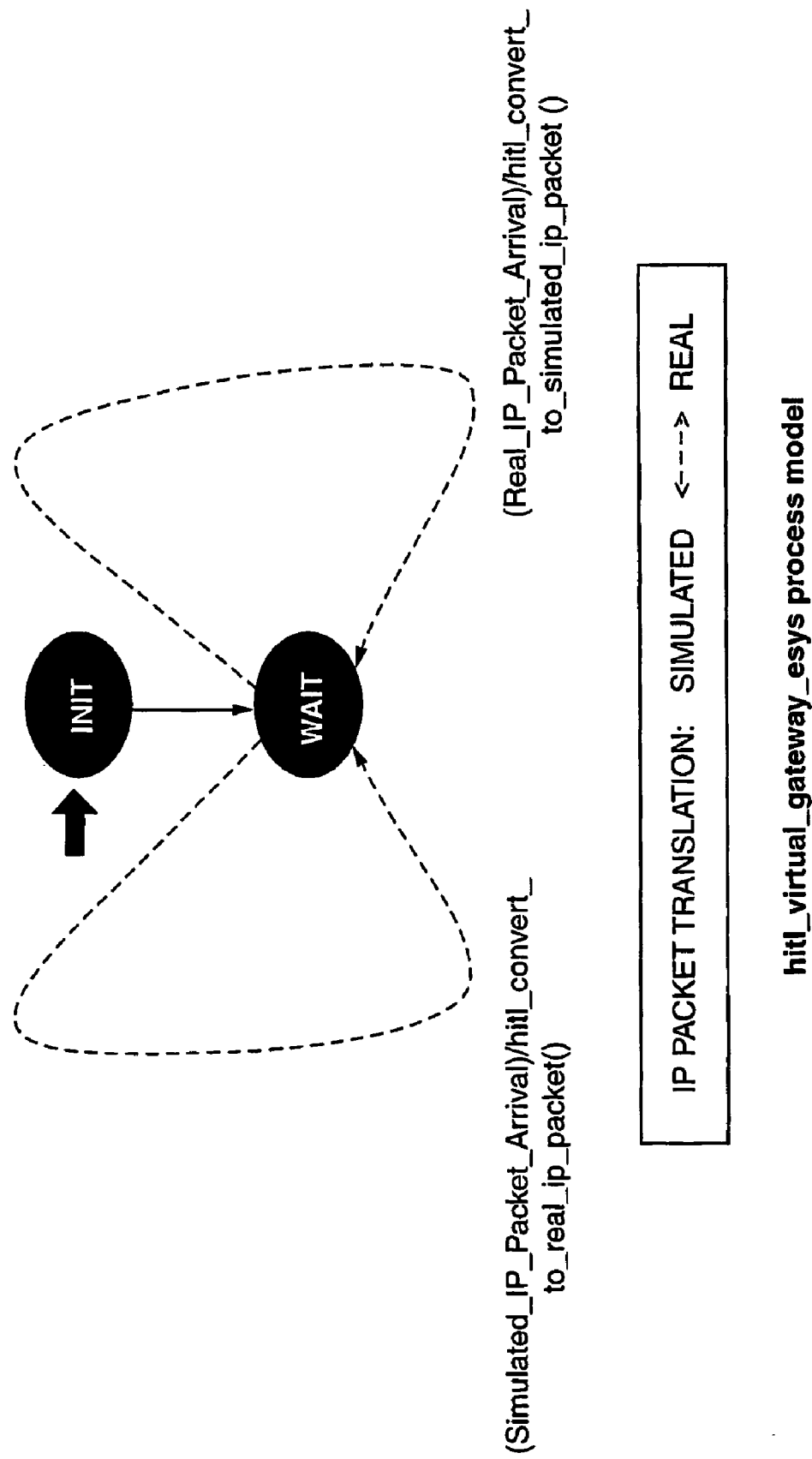
FIG. 4 is a virtual gateway node process model.

Within the external system module, the esys process model shown in FIG. 4 is responsible for handling interrupts and calling the functions required for translating packets, and for providing the actual interface for the passing of packet pointers to and from the external network or device. FIGS. 5, 6 and 7 are tables showing event definition, state-level decomposition, and event response.

Co-Simulation Code

The co-simulation code depicted in FIG. 1 provides an interface between an OPNET simulation and an external network, system or device. The code uses external simulation access (ESA) APIs that are supplied in OPNET's external library. The code is responsible for passing information between the simulation and the external system, and for managing interactions between them.

A general objective of the co-simulation code module is to provide an interface between the OPNET simulation and external software module. Its tasks include passing information and managing interactions between the two modules in real time. In order to perform these duties, a set of application program interfaces (APIs) are provided by OPNET for use by the co-simulation code module to perform the function calls needed to interact between the two modules. In the illustrated embodiment, the co-simulation code also performs additional tasks of encapsulating an outgoing simulated IP packet within an Ethernet frame, and striping an incoming real IP packet from an Ethernet frame.

External System

The external system corresponds to the library or the set of functions used to interact with the network adapter(s) on the computer/workstation running the OPNET simulation. It is responsible for sending packets over the network adapter and for providing a callback when a packet arrives at a particular network interface. For example, WinPcap (<http://winpcap.polito.it/>), a free packet capture library, may be used. The co-simulation code and the external system calls may be compiled into a single DLL which is linked in with the OPNET simulation.

Figure 8:
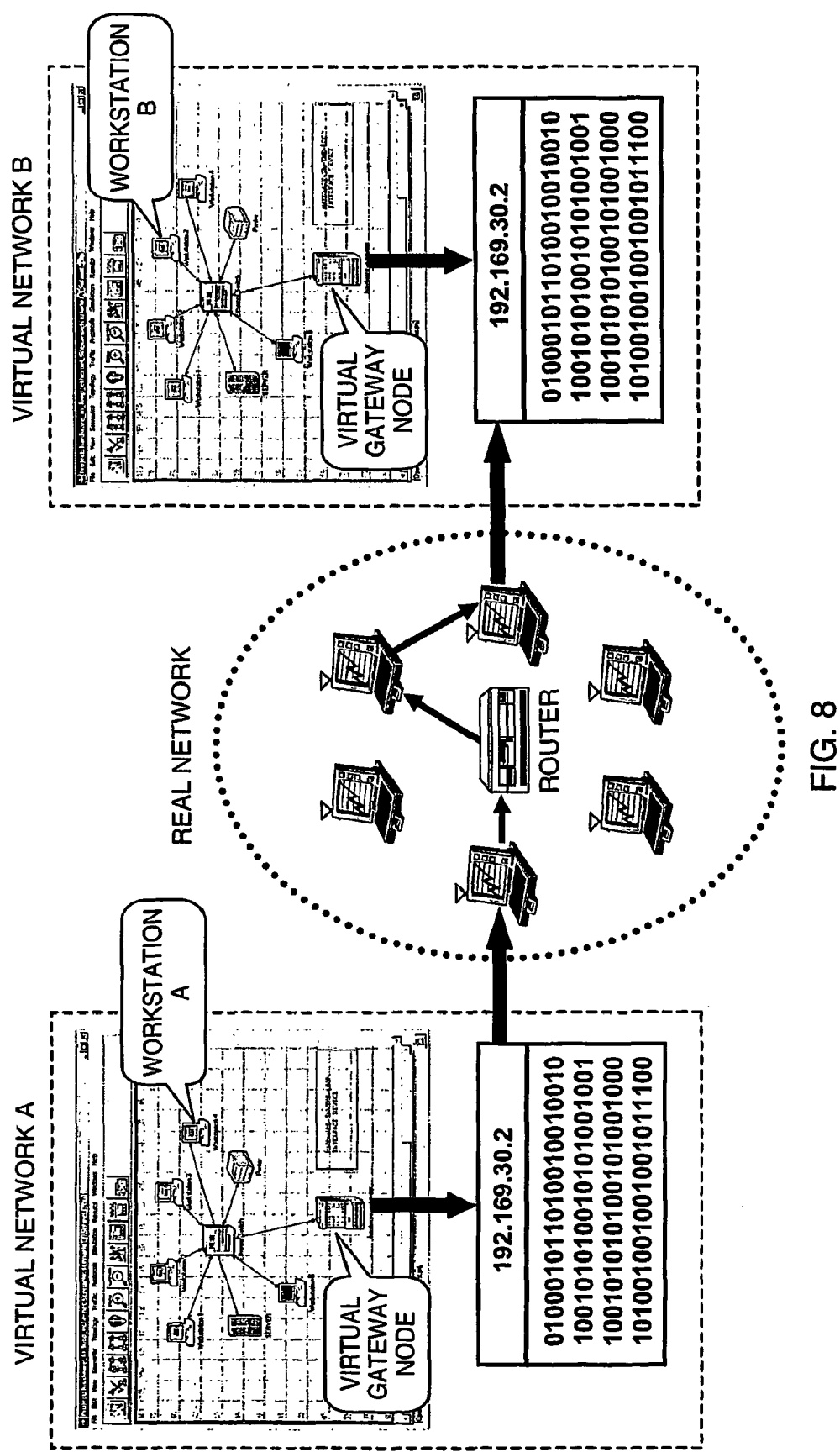
FIG. 8 is a first example of a hardware in the loop (HITL) set up including virtual gateway nodes according to the invention.

Example One (FIG. 8)

Two virtual networks A and B are modeled and simulated by running OPNET on corresponding workstations A and B. The virtual networks exchange packets with one another through real hardware devices including routers. Specifically, virtual gateway nodes are configured in the simulations for connection with physical Ethernet ports on the corresponding workstations. Simulated data traffic is generated and routed within each virtual network through virtual LANs, workstations and routers. When a source node in virtual network A sends traffic to a destination server node being modeled in virtual network B, virtual network A routes the traffic across its routers to its virtual gateway node so that the traffic can be sent to the virtual network B via the gateway node and the real network hardware in the loop.

The gateway node in virtual network A translates the traffic into real IP packets, encapsulates the packets in Ethernet frames for routing in the real network, and performs a series of handshakes between the OPNET simulation and the external hardware for sending the packet out to the real network. The translation is performed by creating a real packet format and mapping the appropriate information (e.g., source and destination address, TTL, etc.) from the generated simulated packets into the fields of a real IP datagram. Once the real network correctly routes the IP packet to virtual network B, a second virtual gateway node configured in virtual network B strips the Ethernet frame from the incoming packet, translates the real IP packet back to an OPNET packet, performs a series of handshakes between simulation and the connected hardware device to insert the translated packet into the simulation, and routes the packet to its destination node in virtual network B.

Figure 9:
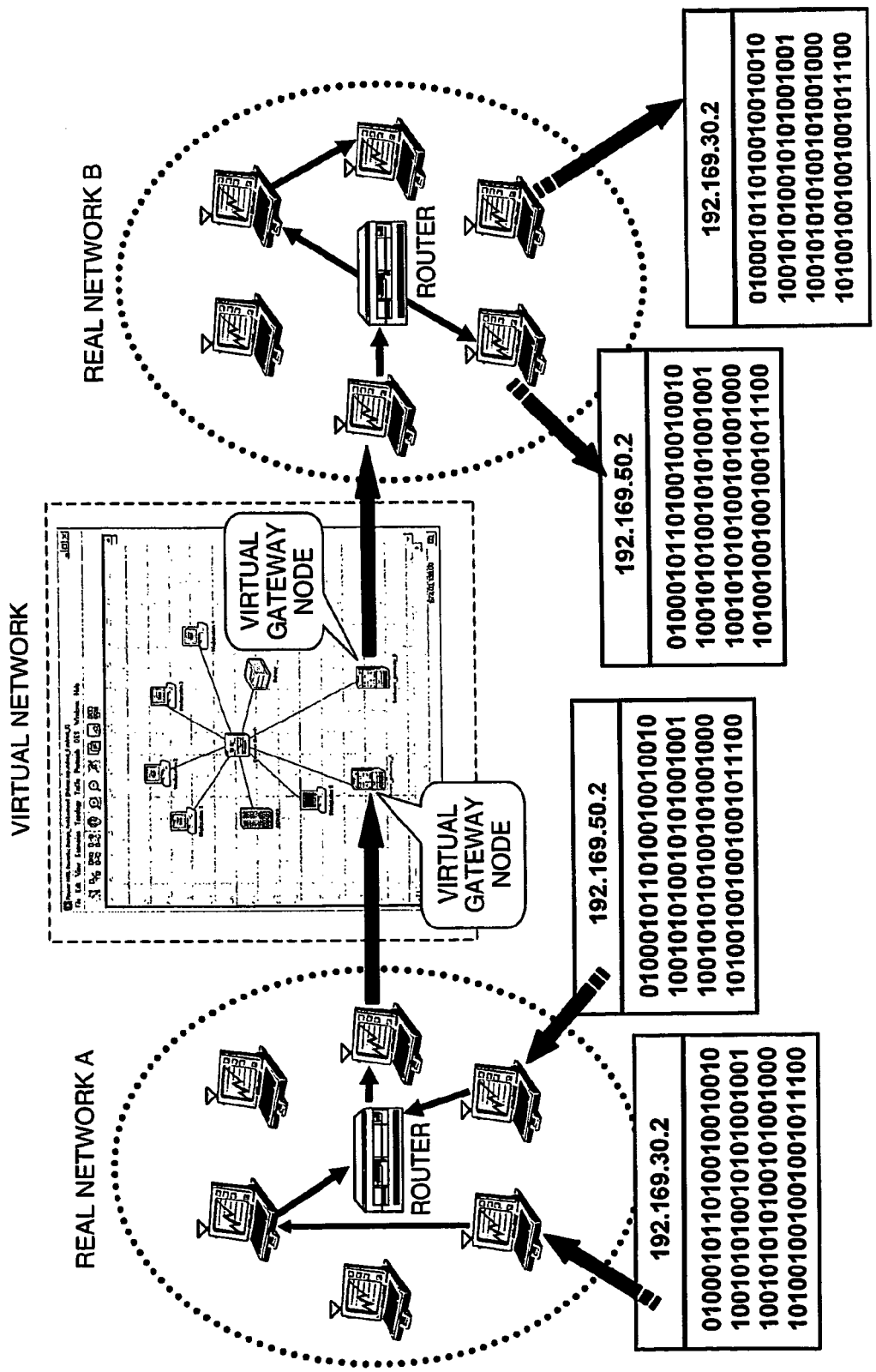
FIG. 9 is a second example of a HITL set up including the virtual gateway nodes.

Example Two (FIG. 9)

Real IP packets created in real IP Network A are sent across a simulated virtual simulated network to real IP Network B. Virtual gateway nodes are configured in the simulated network for connecting the hardware devices of the real networks in a loop with the simulated network. The translation of real IP packets from network A into packets to be routed through the virtual network, is performed so as to preserve the contents and integrity of the real IP packets when the packets arrive at real network B.

Figure 10:
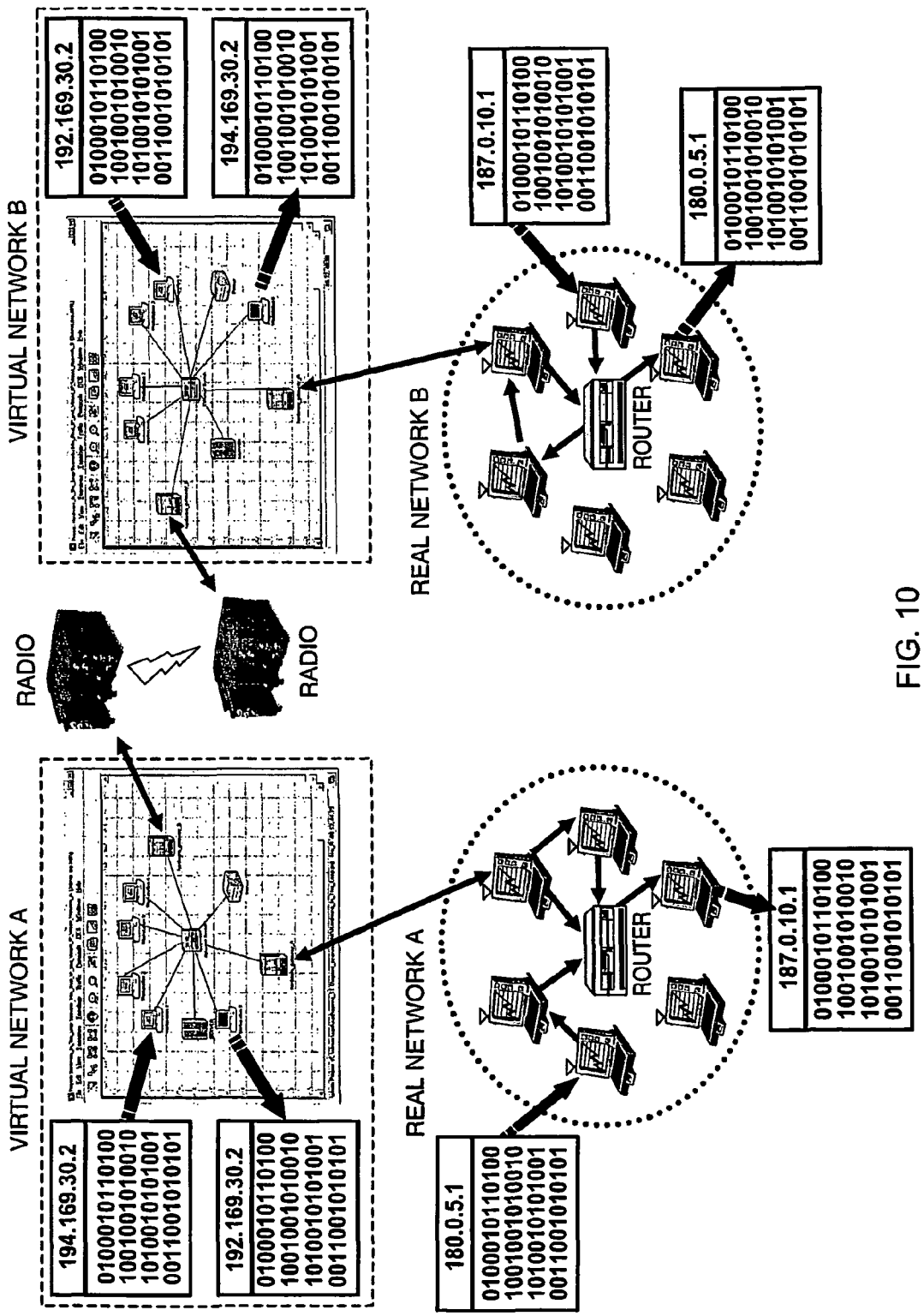
FIG. 10 is a third example of a HITL set up including the virtual gateway nodes.

Example Three (FIG. 10)

Two virtual networks A and B are set up for exchanging virtual and real IP packets. Each virtual network is interfaced via virtual gateway nodes with two different types of physical devices capable of sending real IP network traffic; namely, a Real Network and a Radio. Real IP traffic is exchanged between the real networks and the radios through the virtual networks. Virtual traffic is exchanged and routed to respective destinations in the virtual networks.

Figure 11:
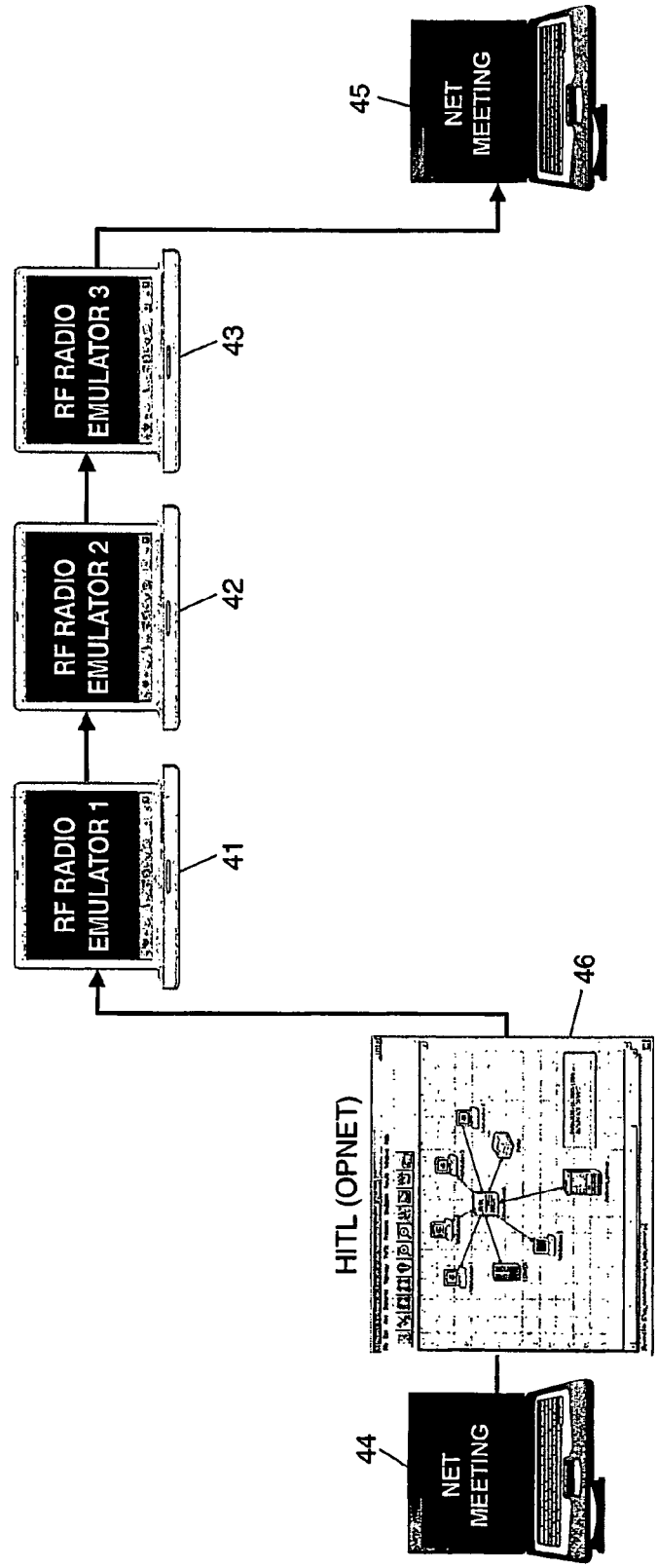
FIG. 11 is a fourth example of a HITL set up including the virtual gateway nodes.

Example Four (FIG. 11)

FIG. 11 shows a HITL setup including:

1. Three RF radio emulators 41, 42, 43 each running on an Apple_PowerBook_computer. Each of the emulators simulates a platform communication system. Known radio simulator interface software is used to define a platform, the particular type of radios on the platform, and waveforms used over each of the radio_s channels. The software simulates a RF network by determining whether each RF radio emulator is within communication range.

2. Two "edge" laptop computers 44, 45 (a video server and a video client) running NetMeeting®.

3. One laptop computer 46 running an OPNET simulation including virtual gateway nodes according to the inventive method.

The OPNET simulations may correspond to on-board computer networks of a MGV (manned ground vehicle) platform, and a UAV (unmanned aerial vehicle platform). Virtual gateway nodes are inserted into the OPNET simulated network to represent connections between the first edge laptop 44 and the simulated network 46, and the first RF radio emulator 41 and the simulated network 46.

The purpose of the set up is to demonstrate that real IP traffic can be communicated/exchanged successfully between two different laptops 44, 45 running an OPNET simulation including the inventive virtual gateway nodes, and the real RF radio emulators 41, 42, 43.

Figure 12:
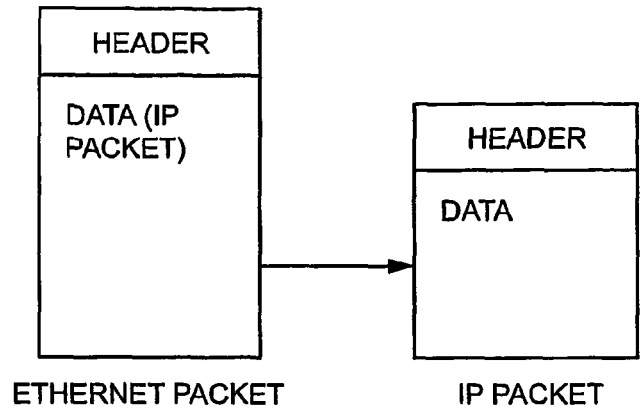
FIG. 12 depicts a conversion of an Ethernet frame to an IP packet according to the invention.

Real IP Packets to Simulated Packets (See FIG. 12)

In the setup of FIG. 11, network adapters on the laptop 46 running the simulation listen for data packets designated for the simulation from the platform systems 41, 42, 43, and filter out data packets that are not destined for the simulation. Once the designated packets arrive at an adapter, the adapter strips off an Ethernet header from each incoming packet to obtain an IP packet. The IP packet is then forwarded to the virtual gateway node for further processing. See FIG. 12.

Each virtual gateway node creates simulated packets each of which has a header with fields including, e.g., orig_len; ident; frag_len; TTL; source address; destination address; f rag; connection class; source internal address; and destination internal address. The node also assigns appropriate values to these fields. Once the packet header is created, the data fields are parsed.

The particular information stored in the data fields of the packets serves to determine whether or not the information is to be translated into an OPNET packet (e.g., TCP). If not, the bits are preserved since the packet will probably be passed back out of the simulation. A protocol field of the packet determines how to parse the data field of the packet. In other words, parsing of the data field depends on whether the incoming packet is destined for a node within the simulation (e.g., a workstation), or for a node in the real network (e.g., a server).

Figure 13:
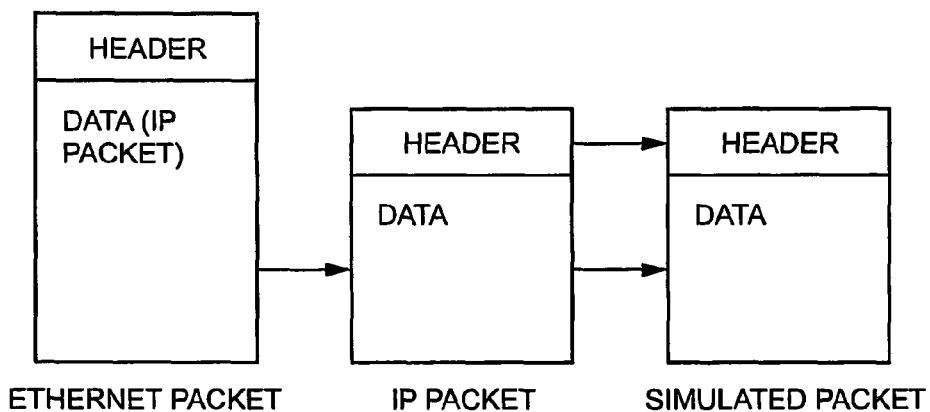
FIG. 13 depicts a conversion of an Ethernet frame to a simulated packet according to the invention.

If a packet is destined for a node within the simulated network, the packet is translated into an OPNET simulated packet (e.g., TCP), wherein the data field in the simulated packet is assigned a value of zero bytes. See FIG. 13.

If a packet is destined for a node of a real network, the packet data field is not translated into an OPNET based packet. Rather, the data contents of the IP packet are copied to the data field of a simulated packet. The simulated packet is then rerouted across the simulated network to a virtual gateway node that acts as a gateway to a destination node that is not within the simulation.

Figure 14:
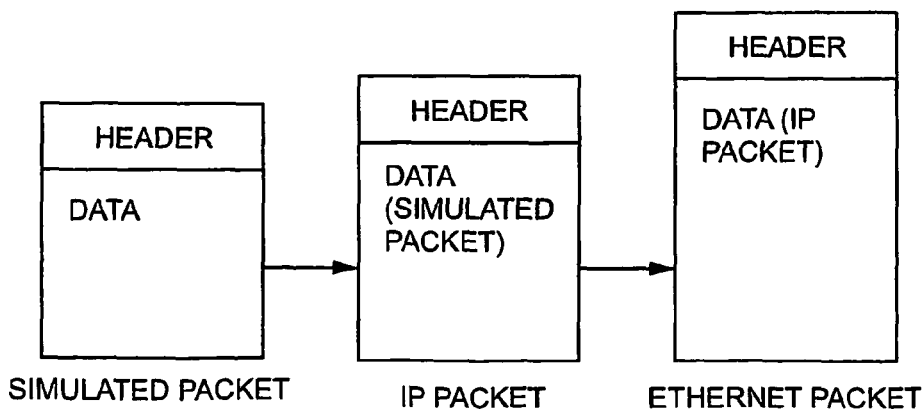
FIG. 14 depicts a conversion of a simulated packet to an Ethernet frame according to the invention.

Simulated Packets to Real Packets (FIG. 14)

Each virtual gateway node also implements a conversion from simulated packets to real IP packets. The simulated packets are encapsulated and packaged in, e.g., IPv4 or IPv6 based datagrams, and subsequently into Ethernet frames prior to sending the packets out to a real network so that real hardware in the network can route the packets accordingly. See FIG. 14.

Each virtual gateway node populates relevant IP header fields during the conversion of a simulated packet to a real IP packet. The IP header fields that are populated by the virtual gateway node include fields such as: IP version; Header Length; Type Of Service (TOS); Total Length; flags; TTL (Time To Live); Protocol; Source Address; and Destination Address. The simulated packet is encapsulated within the data field of the corresponding IP datagram.

If the data field of the simulated packet contains no data (i.e., the packet is a simulation-to-simulation packet exchange), the IP packet is sent to the real network by the network adapter wherein the packet is further encapsulated in an Ethernet frame, and placed in a queue for transmission. No segmentation is necessary.

If, however, the data field of the simulated packet contains data (i.e., a real-to-real packet data exchange), the data is further translated into an application layer format and is encapsulated within the data field of the IP packet. If the size of the IP packet is greater than the TCP segment size, the IP packet is segmented. The packet is sent to the real network by the network adapter wherein the packet is further encapsulated in an Ethernet frame, and placed in a queue for transmission. No segmentation is necessary.

The packets are preferably sent in bursts using a known pcap_send_queue_transmit function, rather than sending them individually using, e.g., pcap_sendpacket. The size of the queue may be based on the maximum size of packets that can be sent in an interval of 1e-4 seconds (this interval is the frequency at which packets are emptied from the queue to be sent). Assuming the maximum transmit data rate of an Ethernet adapter is 1 Gigbps (1e9 bps), then one can estimate that at most 1e5 bits or 12,500 bytes will reside in queue at any given time.

In the setup of FIG. 11, live data (video) initially generated at a video server 44 (NetMeeting) is transmitted across the setup and received at the other end by a video client 45 (NetMeeting). The data is sent through the OPNET simulated network including the virtual gateway nodes. The RF emulators 41, 42, 43 are configured to use a SRW waveform.

Result:
A video connection was obtained although it showed characteristics of a "slow" link, i.e., blocks of video were displayed but without smooth motion.

Figure 15:
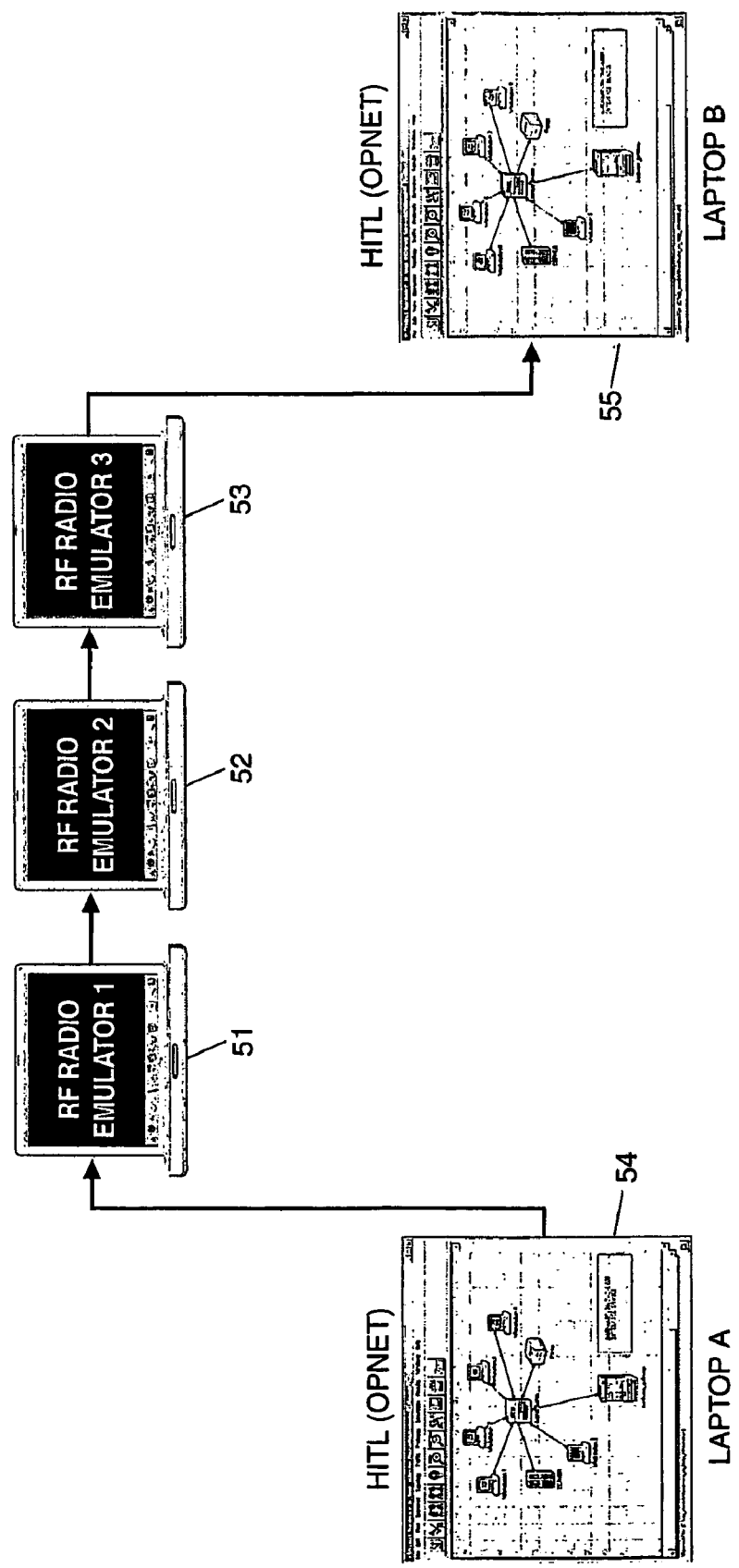
FIG. 15 is a fifth example of a HITL set up including the virtual gateway nodes according to the invention.

Example Five (FIG. 15)

FIG. 15 depicts another HITL setup including:
1. Three RF radio emulators 51, 52, 53 each running on an Apple_PowerBook_. Each of the emulators simulates a platform communication system. Radio Simulator Interface software is used to define a platform, the radios on this platform, and the waveforms for each of the radio_s channels. The software simulates a RF network by determining whether or not each RF radio emulator is within communication range.
2. Two laptops 54, 55 each running an OPNET simulation including the virtual gateway nodes.

The OPNET hosts simulate a virtual host 54 (Laptop A) and server traffic 55 (Laptop B). Simulated data packets are transmitted across the setup. The purpose of the set up is to demonstrate that virtual traffic can be successfully exchanged between two simulated laptops 54, 55 via a real physical medium, i.e, the three RF radio emulators 51, 52, 53. Specifically, OPNET is used to simulate the onboard computer networks of a MGV and a UAV at the laptops A and B. A virtual gateway node is inserted in each of the simulations running on laptops A and B, and each of the gateway nodes is terminated with an Ethernet adapter on the corresponding laptop.
Result:
Similar traffic patterns were observed with and without the radio emulators 51, 52, 53 in the loop.

Figure 16:
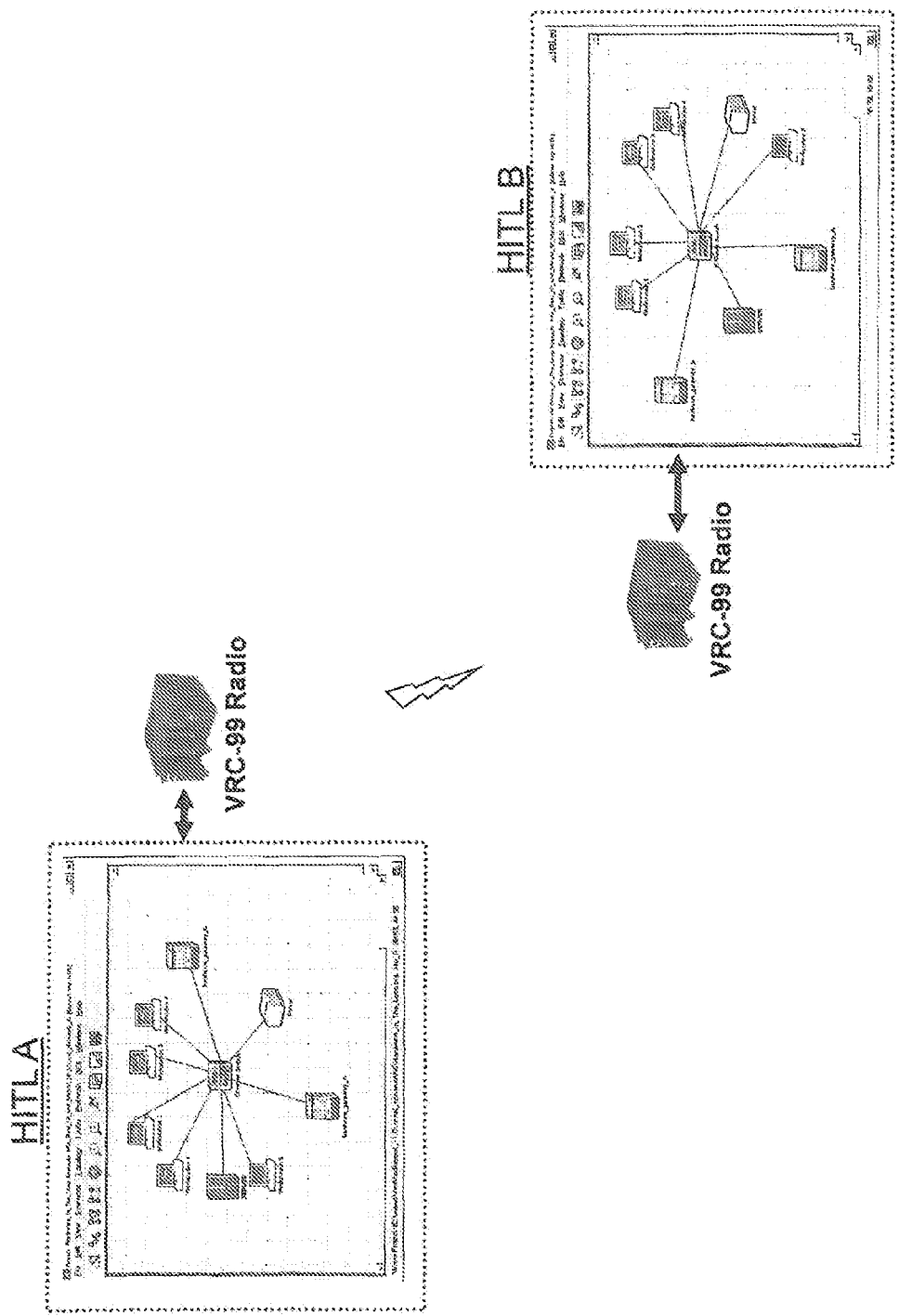
FIG. 16 is a sixth example of a HITL set up including the virtual gateway nodes.

Example Six (FIG. 16)

FIG. 16 depicts a HITL setup that includes two virtual simulations 61, 62 wherein each simulation is connected to an actual/real type VRC-99 Radio 63, 64. Traffic in the form of simulated data packets is exchanged between the two virtual simulations 61, 62 wirelessly via the VRC-99 radios 63, 64.

The purpose of the setup is to demonstrate that virtual traffic can be exchanged between two real networking devices or nodes (e.g., type VRC-99 radios). Each laptop runs an OPNET simulation of a network including a virtual gateway node to act as a source/sink of traffic for the real radios. The virtual gateway nodes are each terminated by an Ethernet adapter on the corresponding OPNET laptop.
Result:
Simulated packets were successfully sent and received by the virtual simulations running on the laptops 61, 62 at both ends.

Figure 17:
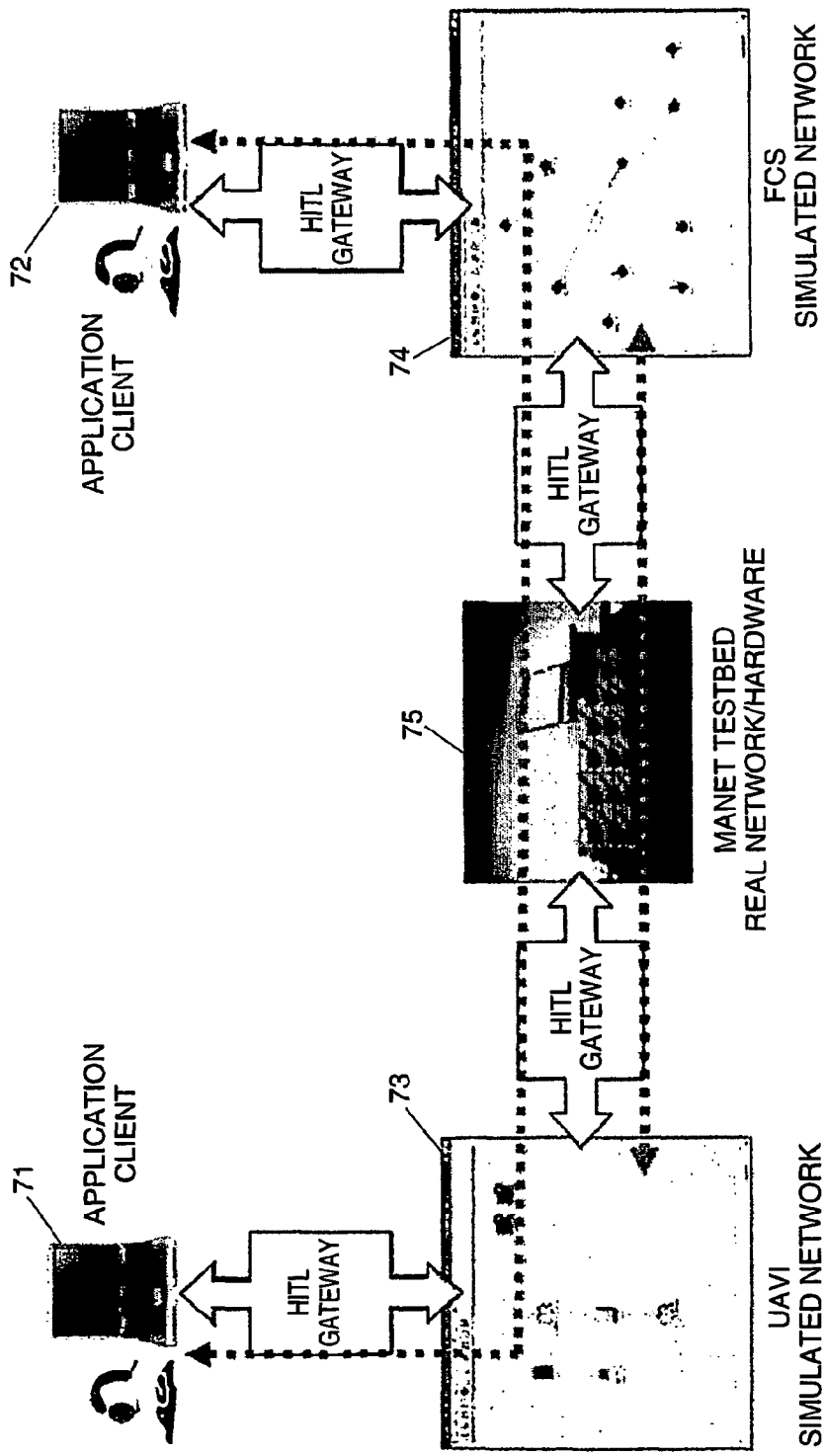
FIG. 17 is a seventh example of a HITL set up including the virtual gateway nodes.

Example Seven (FIG. 17)

In the setup of FIG. 17, two laptops 71, 72 are running client applications (e.g., NetMeeting) and are connected through corresponding UAVI simulated networks 73, 74 to an array of wireless MANET (Mobile Ad-hoc Network) nodes 75. The MANET nodes are single board computers (SBCs) with wireless cards. The simulations may represent a UAVI performing BDA surveillance, sending data over SRW to a forward observer.

The first laptop 71 running the client application generates a video stream and sends it through the UAVI simulated network 73 via a virtual gateway node inserted in the network. The UAVI simulated network 73 forwards the video stream through the wireless MANET nodes 75 to a FCS simulated network 74 residing on another laptop. The FCS simulated network forwards the stream via a virtual gateway node inserted in the network.

The architecture of the present method differs significantly from that previously used for inserting and extracting data packets into and out of real and simulated networks. As mentioned earlier, the known techniques use the concept of sockets for extraction and insertion of packets, requiring a one-to-one mapping between any two simulations between which packets are exchanged. Also, only simulated packets could be exchanged.

By contrast, the present method operates to extract traffic packets directly at the IP layer. This obviates the need for socket creation and provides a more robust simulation package. For example, multiple simulations can be set up and connected via virtual gateway nodes without creating specific TCP socket connections. Moreover, the method supports exchanging of real application traffic or IP packets through one or more simulated networks. In addition, while the prior method supports only a UDP protocol, the present invention supports both TCP and UDP type protocols.

Because the source and the destination environments of packets exchanged under the present method are the same (e.g., real network>simulated network>real network), the present method may be further enhanced to incorporate so-called software-in-the-loop (SITL) technology to allow direct communication between real and virtual networks, wherein virtual and real IP packets may be processed by both virtual and real networks.

A number of advantages may be gained by integrating virtual gateway nodes into network simulations according to the invention. As mentioned, one advantage is the ability to obtain more comprehensive comparison studies between a real hardware device and its virtual model. Tests and evaluations of real world systems may be conducted by representing certain parts of the systems in virtual models using a discrete-event simulator such as OPNET. It will also be appreciated that the present invention can (i) assist in protocol and waveform development where simulations are used as a testbed for real hardware devices, and to observe how the devices perform under realistic conditions, (ii) perform scalability studies or analyses wherein a limited number of real hardware devices may be linked with a simulated network in which a large number of the devices are modeled, (iii) mitigate risks during a hardware development process, especially in early stages of development by performing tests and evaluations of the hardware being developed, and (iv) achieve substantial cost savings.

While the invention has been described in connection with the preferred embodiments of the various figures, it will be understood that similar embodiments may be used or modifications and additions may be made without departing from the spirit and scope of the invention. Therefore, the present invention is to be construed only in accordance with the following appended claims.

We claim:

1. A method of interfacing real and virtual networks in hardware-in-the-loop (HITL) simulations, comprising:
    modeling a first simulated network at a first workstation by running a network simulation program on one or more processors of the workstation;
    providing a first network adapter on the workstation:
    defining a first virtual gateway node in the simulated network for interfacing an external first real network with other nodes of the simulated network;
    linking the virtual gateway node with the first network adapter on the workstation;
    linking the first real network with the first network adapter; and
    configuring the first network adapter and the first virtual gateway node for;
    (i) first translating simulated data packets sent from nodes of the simulated network and designated for the real network, into Internet protocol (IP) data packets for routing or processing by the real network; and
    (ii) second translating IP data packets sent from nodes of the real network and designated for the simulated network, into simulated data packets for routing or processing by the simulated network.

2. The method of claim 1, wherein the first translating step includes encapsulating the simulated packets within IP datagrams, and encapsulating said IP datagrams within Ethernet frames.

3. The method of claim 1, wherein the second translating step includes stripping off Ethernet headers from the designated IP data packets at the network adapter.

4. The method of claim 1, including:
    providing a second network adapter on the first workstation;
    defining a second virtual gateway node in the first simulated network for interfacing an external second real network with other nodes of the simulated network;
    linking the second virtual gateway node with the second network adapter;
    linking the second real network with the second network adapter;
    configuring the second network adapter and the second virtual gateway node for;
    (i) third translating simulated data packets sent from nodes within the simulated network and designated for the second real network into Internet protocol (IP) data packets for routing or processing by the second real network; and
    (ii) fourth translating IP data packets sent from nodes of the second real network and designated for the simulated network, into simulated data packets for routing or processing by the simulated network; and
    exchanging IP data packets between the first and the second real networks by routing the packets through the simulated network.

5. The method of claim 4, wherein the third translating step includes encapsulating the simulated packets within IP datagrams, and encapsulating said IP datagrams within Ethernet frames.

6. The method of claim 4, wherein the fourth translating step includes stripping off Ethernet headers from the designated IP data packets at the second network adapter.

7. The method of claim 1, including:
    modeling a second simulated network at a second workstation by running a network simulation program on one or more processors of the second workstation;
    providing a second network adapter on the second workstation:
    defining a second virtual gateway node in the second simulated network for interfacing the first real network with other nodes of the second simulated network;
    linking the second virtual gateway node with the second network adapter;
    linking the first real network with the second network adapter;
    configuring the second network adapter and the second virtual gateway node for;
    (i) third translating simulated data packets sent from nodes of the second simulated network and designated for the first real network, into Internet protocol (IP) data packets for routing or processing by the first real network; and (ii) fourth translating IP data packets sent from nodes of the first real network and designated for the second simulated network, into simulated data packets for routing or processing by the second simulated network; and exchanging simulated data packets between the first and the second simulated networks by routing the packets through the first real network.

8. The method of claim 7, wherein the third translating step includes encapsulating the simulated packets within IP datagrams, and encapsulating said IP datagrams within Ethernet frames.

9. The method of claim 7, wherein the fourth translating step includes stripping off Ethernet headers from the designated IP data packets at the second network adapter.

10. Apparatus for interfacing real and virtual networks in hardware-in-the-loop (HITL) simulations, comprising:
a first workstation having one or more processors configured and programmed for modeling a first simulated network;
a first network adapter operatively connected to the workstation:
the processors of the workstation are programmed for (a) defining a first virtual gateway node in the simulated network for interfacing an external first real network with other nodes of the simulated network, (b) linking the virtual gateway node with the first network adapter on the workstation, and (c) linking the first real network with the first network adapter; and
the first network adapter and the first virtual gateway node are configured for:
(i) first translating simulated data packets sent from nodes of the simulated network and designated for the real network, into Internet protocol (IP) data packets for routing or processing by the real network; and
(ii) second translating IP data packets sent from nodes of the real network and designated for the simulated network, into simulated data packets for routing or processing by the simulated network.

11. The apparatus of claim 10, wherein the first network adapter and the first virtual gateway node are configured to carry out the first translating operation by encapsulating the simulated packets within IP datagrams, and encapsulating the IP datagrams within Ethernet frames.

12. The apparatus of claim 10, wherein the first network adapter and the first virtual gateway node are configured to carry out the second translating operation by stripping off Ethernet headers from the designated IP data packets at the network adapter.

13. The apparatus of claim 10, including:
a second network adapter operatively connected to the first workstation;
the processors of the workstation are programmed for (a) defining a second virtual gateway node in the simulated network for interfacing an external second real network with other nodes of the simulated network, (b) linking the second virtual gateway node with the second network adapter on the workstation, and (c) linking the second real network with the second network adapter; and the second network adapter and the second virtual gateway node are configured for;
(i) third translating simulated data packets sent from nodes within the simulated network and designated for the second real network into Internet protocol (IP) data packets for routing or processing by the second real network; and
(ii) fourth translating IP data packets sent from nodes of the second real network and designated for the simulated network, into simulated data packets for routing or processing by the simulated network;
wherein IP data packets are operatively exchanged between the first and the second real networks by routing the packets through the simulated network.

14. The apparatus of claim 13, wherein the second network adapter and the second virtual gateway node are configured to carry out the third translating operation by encapsulating the simulated packets within IP datagrams, and encapsulating the IP datagrams within Ethernet frames.

15. The apparatus of claim 13, wherein the second network adapter and the second virtual gateway node are configured to carry out the fourth translating operation by stripping off Ethernet headers from the designated IP data packets at the second network adapter.

16. The apparatus of claim 10, including:
a second workstation having one or more processors configured and programmed for modeling a second simulated network;
a second network adapter operatively connected to the second workstation:
the processors of the second workstation are programmed for (a) defining a second virtual gateway node in the second simulated network for interfacing the first real network with other nodes of the second simulated network, (b) linking the second virtual gateway node with the second network adapter at the workstation, and (c) linking the first real network with the second network adapter; and
the second network adapter and the second virtual gateway node are configured for;
(i) third translating simulated data packets sent from nodes of the second simulated network and designated for the first real network, into Internet protocol (IP) data packets for routing or processing by the first real network; and
(ii) fourth translating IP data packets sent from nodes of the first real network and designated for the second simulated network, into simulated data packets for routing or processing by the second simulated network;
wherein simulated data packets are operatively exchanged between the first and the second simulated networks by routing the packets through the first real network.

17. The apparatus of claim 16, wherein the second network adapter and the second virtual gateway node are configured to carry out the third translating operation by encapsulating the simulated packets within IP datagrams, and encapsulating the IP datagrams within Ethernet frames.

18. The apparatus of claim 16, wherein the second network adapter and the second virtual gateway node are configured to carry out the fourth translating operation by stripping off Ethernet headers from the designated IP data packets at the second network adapter.

* * * * *